(12) United States Patent
Thomas

(10) Patent No.: US 10,611,597 B1
(45) Date of Patent: Apr. 7, 2020

(54) DEVICE FOR ROLLER ASSEMBLY, AND RELATED SYSTEMS AND METHODS

(71) Applicant: Amazon Technologies, Inc., Seattle, WA (US)

(72) Inventor: Bryan Chad Thomas, Dover, PA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 15/875,238

(22) Filed: Jan. 19, 2018

(51) Int. Cl.
*B65H 59/04* (2006.01)
*B65H 51/04* (2006.01)
*B65H 49/24* (2006.01)
*C09J 7/00* (2018.01)
*B65C 9/18* (2006.01)

(52) U.S. Cl.
CPC ............. *B65H 59/04* (2013.01); *B65C 9/18* (2013.01); *B65H 49/24* (2013.01); *B65H 51/04* (2013.01); *C09J 7/00* (2013.01); *B65H 2301/412* (2013.01); *B65H 2601/511* (2013.01); *B65H 2701/377* (2013.01)

(58) Field of Classification Search
None
See application file for complete search history.

(56) References Cited

PUBLICATIONS

3M-Matic™ Accuglide™ 2+ Type 10500 Upper and Lower Standard Taping Heads 2 Inch, Instructions and Parts List, Mar. 2017.*
AccuGlide™ HST 3 Inch Upper and Lower Taping Heads Type 41000, Instructions and Parts List, Feb. 2010.*

* cited by examiner

*Primary Examiner* — Jeffry H Aftergut
(74) *Attorney, Agent, or Firm* — BakerHostetler

(57) ABSTRACT

A roller assembly for a taping device includes a roller body defining a central bore, a bushing configured to be received within the central bore and rotationally fixed to the roller body, and a shaft configured to be disposed within the central bore. The shaft defines an outer surface that extends through the bushing. The shaft has a boss that extends radially outward from the outer surface. A resistance element is disposable within the central bore is configured to contact the bushing and the boss in a manner providing an amount of rotational resistance between the roller body and the shaft when the roller assembly is in an assembled configuration.

20 Claims, 5 Drawing Sheets

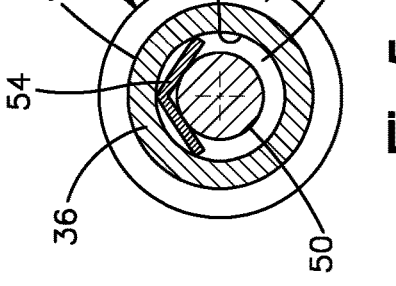
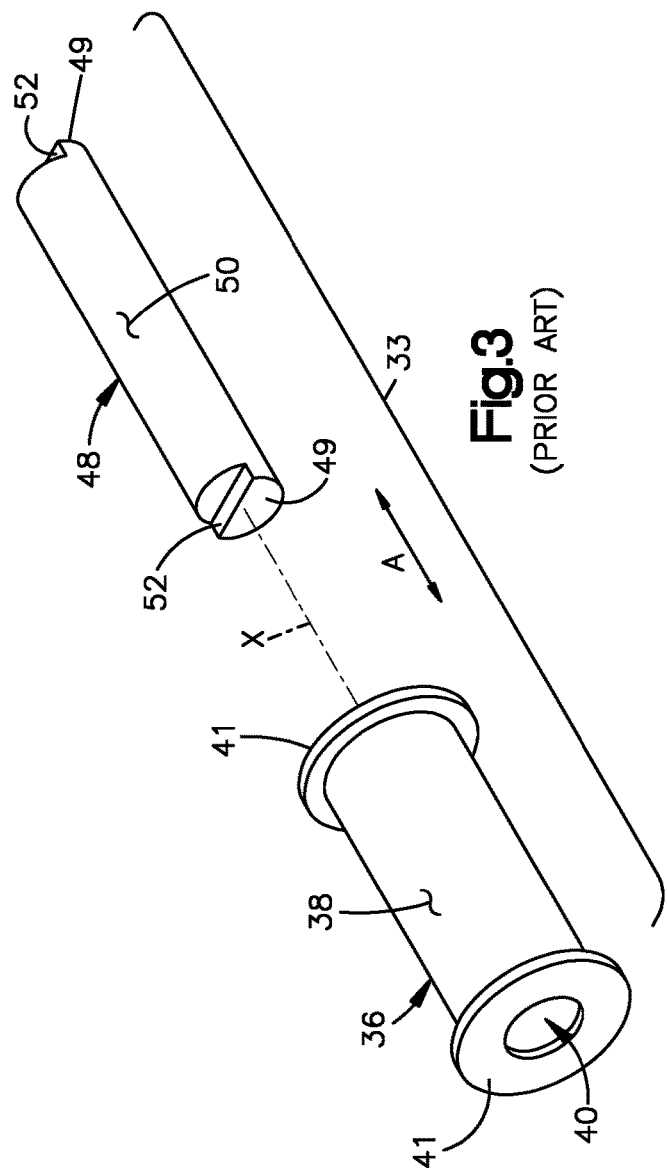
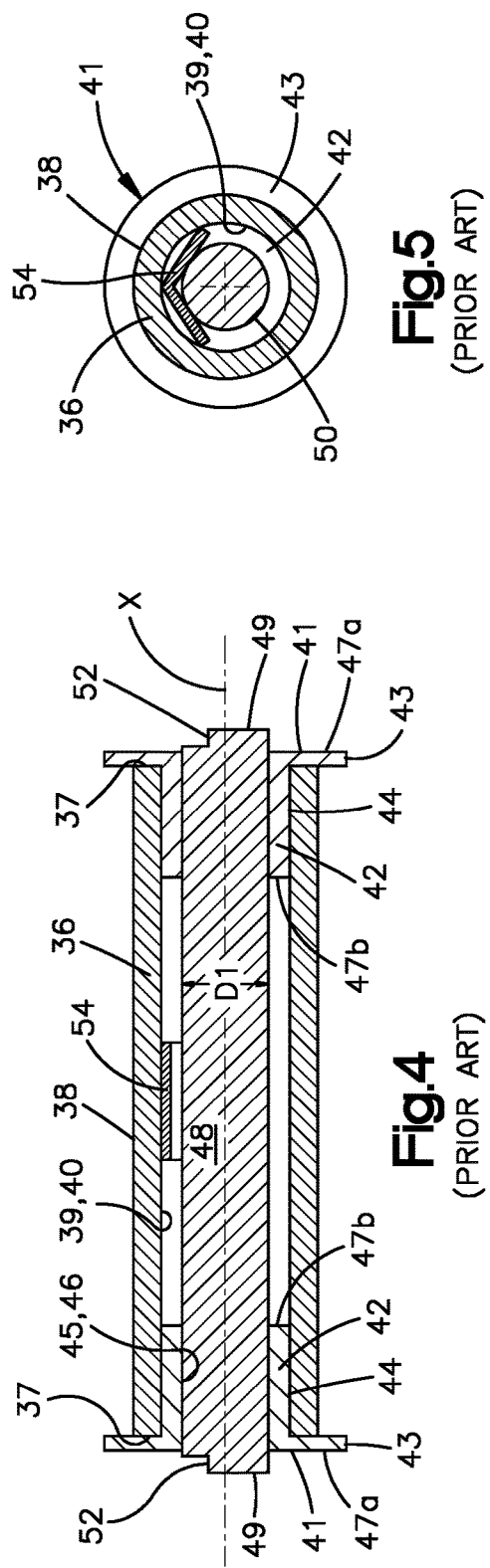

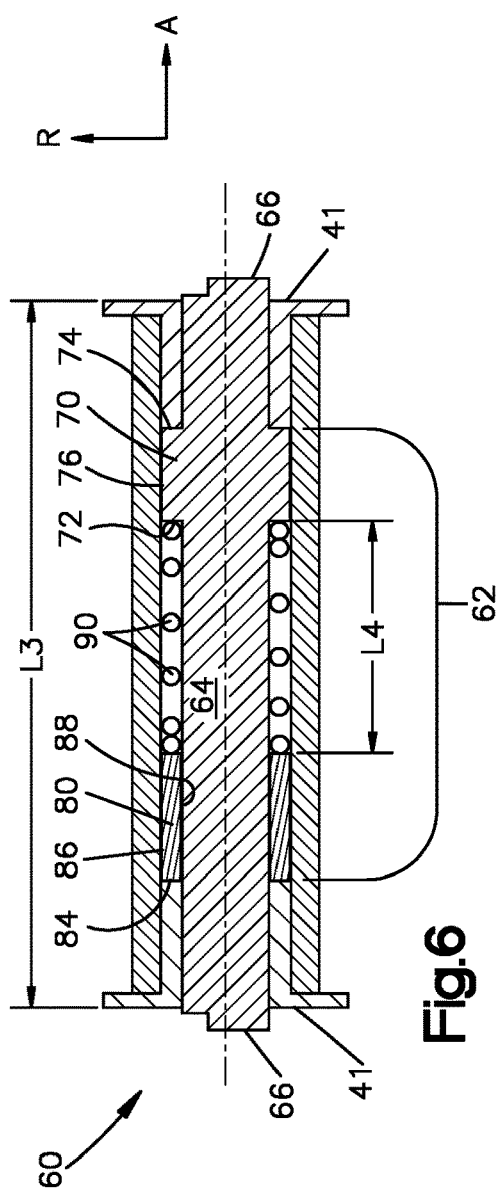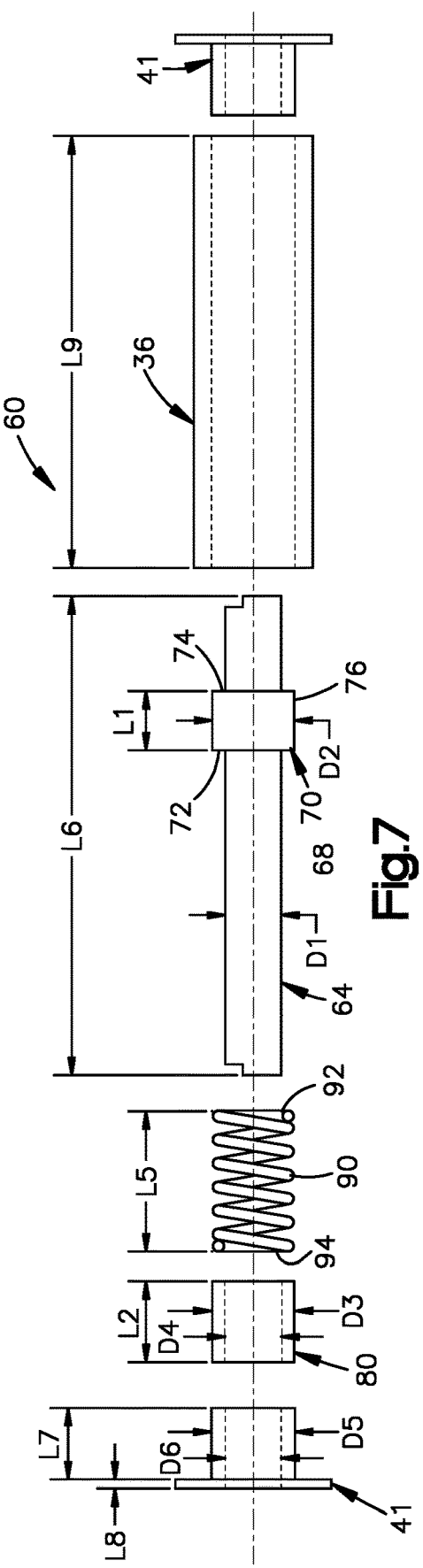

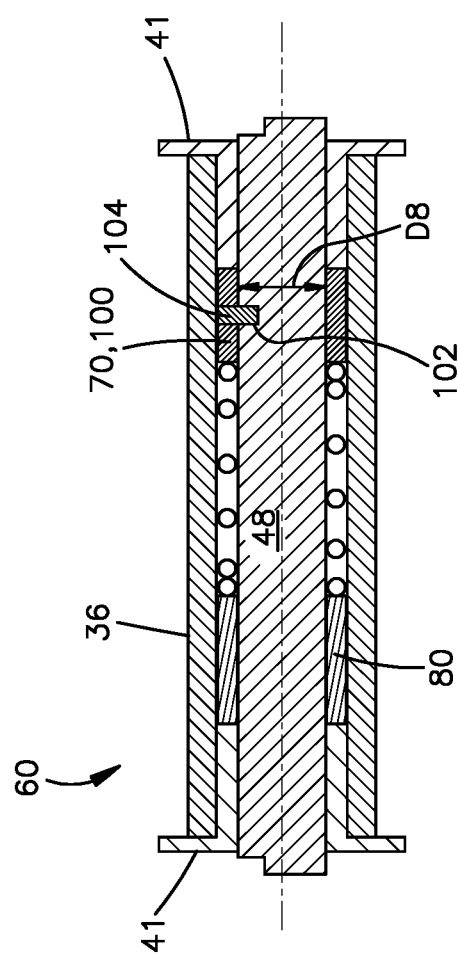

DEVICE FOR ROLLER ASSEMBLY, AND RELATED SYSTEMS AND METHODS

BACKGROUND

Automated taping assemblies are employed in numerous types of packing facilities, such as order fulfilment centers and sortation centers, for example. In such facilities, items can be picked from inventory, conveyed through numerous means of mechanical conveyance to sortation stations, wherein the items are placed into packages, such as cardboard boxes, and the packages are thereafter conveyed to the automated taping assemblies. In high volume packaging facilities, un-planned downtime of a single automated taping assembly can result in significant costs.

Referring to FIG. 1, a taping device 2 for one such automated taping assembly includes a housing, or frame 4, that includes a mount 6 configured to carry a roll 7 of tape 8. In the embodiment illustrated, the taping device 2 is configured to dispense tape 8 with an adhesive side 10 and a non-adhesive side 12; although, in other embodiments, the taping device 2 can be configured to dispense dual-sided adhesive tape. The illustrated taping device 2 is an AccuGlide™ 2+ Standard Taping Device (STD) 3 Inch Lower Taping Head, produced by 3M Company Corporation (referred to herein as "3M"), located at Delaware 3M Center, 2501 Hudson Road, St. Paul, Minn., 55144. The foregoing taping device 2 is also referred to hereinafter as the "tape head."

With continued reference to FIG. 1, the tape head 2 includes a plurality of rollers 14 that are configured to engage the tape 8 so as to convey the tape 8 from the mount 6 to an application roller 16 located at a dispensing region 18 of the tape head 2. The application roller 16 is carried by a first pair of arms 20 that are coupled to the frame 4 in a manner so as to be able to retract at least partially within the frame 4.

As also shown in FIG. 2, packages are configured to approach the tape head 2 in a direction of conveyance 22. The application roller 16 is configured to engage the adhesive side 10 of the tape 8 to a leading side of the package, and thereafter retract rearwards and downwards into the frame 4 as the package continues against the application roller 16 in the direction of conveyance 22. As described above, the application roller 16 can retract at least partially within the frame 4 responsive to pressure applied against the application roller 16 in the direction of conveyance 22 until a lower surface of the package is able to translate over the application roller 16. The application roller 16 is operatively coupled to a blade 24, a blade guard 26, and a second pair of arms 27 carrying a buffer roller 28 that is biased in a manner providing a secondary means of pressing the tape 8 against the lower surface of the package. After the trailing side of the package passes the application roller 16, the application roller 16 is released from retraction, triggering the blade 24 to cut the tape 8, after which the buffer roller 28 pivots upward to press the terminal portion of the tape 8 against at least a portion of the trailing side of the package. It is to be appreciated that the tape head 2 shown in FIGS. 1 and 2 can be inverted and employed, with only minor modifications, as an "upper" tape head of an automated taping assembly. Those skilled in the art will recognize that an upper tape head can operate in a manner similar to that described above with respect to the lower tape head 2, with the exception that the upper tape head applies the tape 8 to an underside of the package. Thus, it is to be understood that the tape head 2 described herein can be employed as an upper or lower tape head.

The plurality of rollers 14 of the tape head 2 include a first or "tension-wrap" roller 31, a second or "one-way tension" roller 32, a third or "knurled" roller 33, and fourth or "wrap" roller 34, and the application roller 16. In the illustrated embodiment, the one-way tension roller 32 and the knurled roller 33 both engage the adhesive side of the tape. The one-way tension roller 32 can also have a knurled outer surface. The following disclosure will focus primarily on the knurled roller 33.

Referring now to FIGS. 3 through 5, the knurled roller 33 includes a roller body 36 that is rotatable about a central axis X. The roller body 36 defines opposed ends 37 and an outer surface 38 that extends between the ends 37. The outer surface 38 is knurled or otherwise textured to enhance engagement with the adhesive surface 10 of the tape 8. The roller body 36 also defines an inner surface 39 that defines a central bore 40 of the roller body 36. The knurled roller 33 includes a pair of end caps 41 coupled to the ends 37 of the roller body 36. The end caps 41 each include a first portion 42 that extends within the central bore 40 and a second portion 43 that defines a flange that abuts the associated end 37 of the roller body 36 when the knurled roller 33 is in an assembled configuration. The first portion 42 of each end cap 41 defines an outer surface 44 that is configured to fit snugly against the inner surface 39 of the roller body 36. Each end cap 41 also defines an inner surface 45 that defines a central bore 46 of the end cap 41. An axial outer end surface 47a of the flange 43 defines an axial outermost end of the end cap 41. An axial inner end surface 47b of the first portion 42 defines an axial innermost end of the end cap 41. When the knurled roller 33 is in the assembled configuration, the axial outermost ends 47a of the end caps 41 are spaced from each other in an axial direction A so as to provide a measure of clearance between the end surfaces 47 and the first pair of arms 20. The roller body 36 together with the end caps 41 are assigned 3M Part No. 78-8076-4737-1 in the publication entitled "Instruction and Parts List: 3M-Matic™ Accuglide™ 2+ Type 10500 Upper and Lower Standard Taping Heads 3 Inch," having a publication date of April 2017 (this publication is referred to hereinafter as the "3M Instruction and Parts List").

The knurled roller 33 includes a shaft 48 that is receivable within the central bore 40 of the roller body 36 and the central bores 46 of the end caps 41. The shaft 48 defines opposed ends 49 and an outer surface 50 that extends between the ends 49. The outer surface 50 defines a first diameter D1 of about 10 mm (about 0.394 inch). The ends 49 of the shaft 48 each define recesses 52 for keyed engagement with corresponding keyed slots formed in the first pair of arms 20. In this manner, the shaft 48 is locked against rotation relative to the first pair of arms 20 while the roller body 36 rotates around the shaft 48. The inner surfaces 45 of the end caps 41 can effectively define a bearing surface against the outer surface 50 of the shaft 48 so that the roller body 36 and the end caps 41 can rotate in unison about the shaft 48 during operation. Additionally, the shaft 48 is sized so that an axially outward facing surface 53 of each recess 52 is positioned at least flush with, and preferably marginally outward from, the axial outer end surface 47 of the associated end cap 41 when the knurled roller 33 is in the assembled configuration. This provides the clearance between the end caps 41 and the first pair of arms 20. The shaft 48 is assigned 3M Part No. 78-8076-4736-3 in the 3M Instruction and Parts List.

As shown in FIGS. 4 and 5, the knurled roller 33 includes a leaf spring 54 disposed within the central bore 40 between the outer surface 50 of the shaft 48 and the inner surface 39 of the roller body 36. The leaf spring 54 is configured to provide a predetermined amount of rotational resistance between the roller body 36 and the shaft 48. This predetermined amount of rotational resistance is critical to operation of the tape head 2. If the leaf spring 54 fails to provide the predetermined amount of rotational resistance, the tape head 2 will not apply tape 8 correctly to the packages. These taping errors require the tape head 2 to be shut down for servicing, repair, or replacement. In high volume taping lines, such as those disclosed in an order fulfillment center, the downtime of the tape head 2 can quickly result in substantial losses in operating costs.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3 shows a partially exploded perspective view of a roller assembly of the prior art taping device of FIG. 1;

FIG. 4 shows a sectional side view of the prior art roller assembly of FIG. 3 shown in an assembled configuration;

FIG. 5 shows a sectional end view of the prior art roller assembly shown in FIG. 4;

FIG. 6 shows a sectional side view of a refurbished roller assembly for use with the taping device of FIG. 1, according to an embodiment of the present disclosure;

FIG. 7 shows an exploded side view of the refurbished roller assembly of FIG. 6; and FIG. 8 shows a sectional side view of a refurbished roller assembly for use with the taping device of FIG. 1, according to another embodiment of the present disclosure.

DETAILED DESCRIPTION

Figure 1:
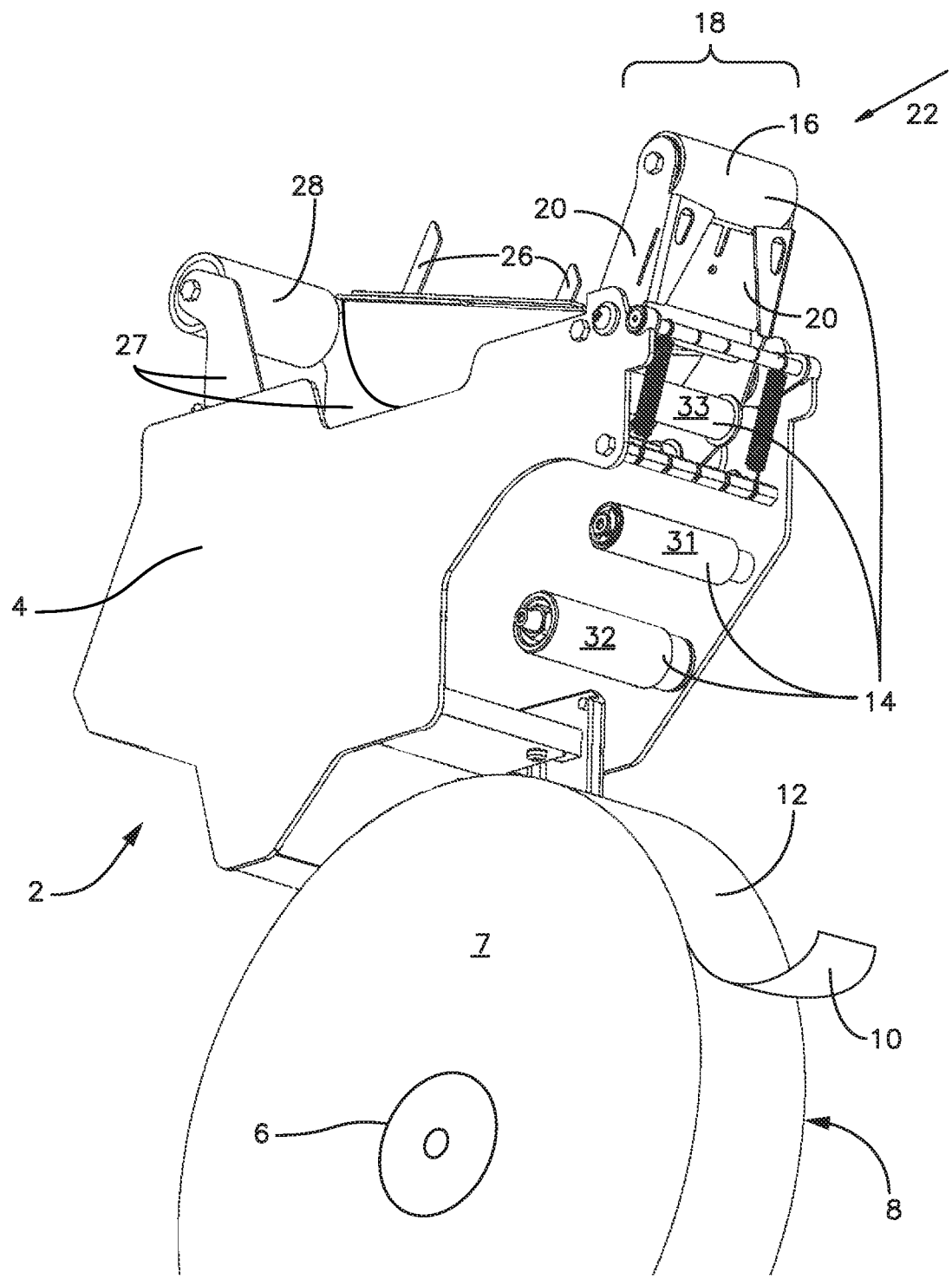
FIG. 1 shows a perspective view of a prior art taping device for use with an automated taping assembly.
Figure 2:
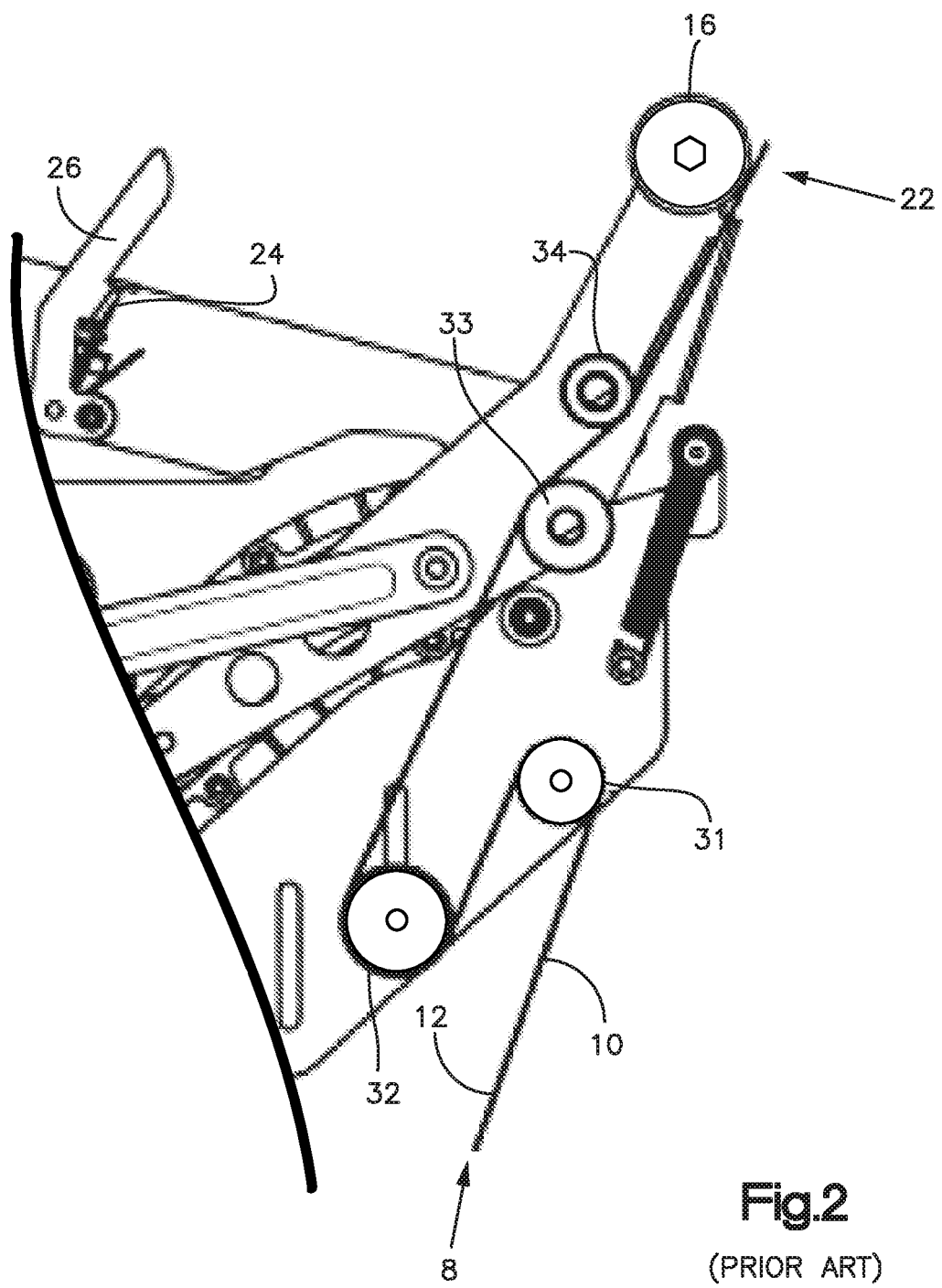
FIG. 2 shows a side plan view of a portion of the prior art taping device of FIG. 1, depicting a tape threading path of the device.

The inventor has discovered that, on the lower tape heads 2 employed in a fulfillment center, the stock leaf spring 54 of the knurled roller 33 fails on average at about 15,000 cycles. This failure of the leaf spring 54 causes the knurled roller 33 to substantially "free spin" (i.e., rotate substantially without resistance about the shaft 48). This caused substantial taping errors with the packages engaging the tape head 2, and resulted in significant amounts of unscheduled downtime. For example, once the leaf spring 54 fails, the free spinning knurled roller 33 has a tendency to allow the tension in the tape 8 to pull the end of the tape proximally from the application roller 16 and retract towards the frame 4. This requires stopping the packaging line employing the tape head 2 while the tape end is manually pulled back out and re-engaged with the application roller 16. The same problems can occur on a similarly-configured upper tape head, although gravity causes the foregoing taping errors to be more prevalent on the lower tape heads 2.

The inventor found that disassembling the tape head 2 and replacing the knurled roller 33 with a new one (carrying a new leaf spring) resulted in extending the operational life of the repaired tape head 2 on average by about 15,000 cycles to a total of about 30,000 cycles. The inventor subsequently discovered that disassembling the knurled roller 33 itself, flexing the leaf spring, and reassembling the roller 33 added an average of about 20,000 cycles to the service life of the tape head 2. The inventor subsequently discovered that purchasing a roll of spring steel and using pieces thereof to replace the failed leaf springs of the knurled rollers 33 also provided benefits to the service life of the tape head 2. However, at the usage rates of the tape heads 2 employed in a particular fulfillment center, an operational life of 50,000 cycles equates to less than about 7 days of operation, at least on the heaviest usage line in the fulfillment center (which operates at about 400 cycles per hour for about 20 hours per day). Thus, a different approach to improving the knurled roller 33 was needed. One approach that the inventor attempted was to replace the leaf spring 54 with a one-way roller bearing. However, this proved unsuccessful, as it was discovered that the knurled roller 33 needed to rotate in reverse at times. Without the ability to rotate in reverse, the tape legs applied to the packages were longer than desired.

Referring now to FIGS. 6 and 7, an improved knurled roller assembly 60 for use with the tape head 2 described above includes a resistance mechanism 62 that can be employed with the roller body 36 and the end caps 41 described above. The resistance mechanism 62 provides the roller assembly 60 with the predetermined amount of rotational resistance over a substantially increased service life.

The resistance mechanism 62 includes a shaft 64 that defines opposed ends 66 and an outer surface 68 that extends between the ends 66. The shaft 64 is configured substantially similar to the shaft 48 described above with reference to FIGS. 3 through 5, with an exception being that the shaft 64 of the present embodiment includes a radial extension, such as a boss 70, that extends outward from the outer surface 68 of the shaft 64 along a radial direction R that is substantially perpendicular to the axial direction A. The boss 70 defines a first end surface 72 and a second end surface 74 spaced from each other by a first distance L1 along the axial direction A. The first and second end surfaces 72, 74 of the boss 70 can each extend in the radial direction R and can each face in the axial direction A. The boss 70 also defines an outer surface 76 that defines a second diameter D2 greater than the first diameter D1. The boss 70 can be sized such that the outer surface 76 thereof is separated from the inner surface 39 of the roller body 36 by a gap so as not to interfere with rotation of the roller body 36 about the shaft 64. In the illustrated embodiment, the boss 70 is monolithic with the shaft 64 so that the boss 70 rotates uniformly with the shaft 64 during use. In this embodiment, the shaft 64 can be characterized as a step shaft. However, in other embodiments the boss 70 can be a separate element coupled to the shaft 64, as described in more detail below The roller assembly 60 includes a bushing 80, such as a plain or sleeve bearing, disposed within the central bore 40 of the roller body 36. The bushing 80 can be of the type used as drill bushings, and can be formed of hardened carbon steel, by way of non-limiting example. The bushing 80 can define a first end surface 82 and an opposed second end surface 84 spaced from each other by a second distance L2 along the axial direction A. The bushing defines an outer surface 86 that defines a third diameter D3. The third diameter D3 can be sized so that the bushing 80 is press fit within the central bore 40 of the roller body 36. In this manner, the bushing 80 and the roller body 36 are configured to rotate substantially uniformly about the outer surface 76 of the shaft 64 during use. The bushing 80 also defines an inner surface 88 radially inward from the outer surface 86 so as to define a central bore of the bushing 80. The inner surface 88 defines a fourth diameter D4, which is at least slightly greater than the diameter D1 of the shaft 48 so that the bushing can rotate about the shaft 48 substantially without rotational resistance.

In the present embodiment, when the roller assembly 60 is in the assembled configuration (as shown in FIG. 6): the flanges 43 of the end caps 41 abut the outer ends 37 of the roller body 36; the axial outer end surfaces 47a of the end caps 41 are spaced from each other by a third distance L3 measured along the axial direction A; the axial inner end surfaces 47b of the end caps 41 abut the respective second ends 74, 84 of the boss 70 and the bushing 80; and the respective first end surfaces 72, 82 of the boss 70 and the bushing 80 face each other and are spaced from each other by a fourth distance L4 measured along the axial direction A. The fourth distance L4 can be in the range of about 10 mm to about 30 mm, and more particularly in the range of about 16 mm to about 22 mm. In other embodiments, however, the fourth distance can be less than 10 mm and more than 30 mm.

The roller assembly 60 includes a resistance element, such as a coil compression spring 90, for example, that can be positioned within the central bore 40 and received over the outer surface 68 of the shaft 64 in the space between the inward-facing first end surfaces 72, 82 of the boss 70 and the bushing 80. The spring 90 has opposed first and second ends 92, 94 spaced from each other along the axial direction A. The spring 90 defines a fifth distance L5 (i.e., a "free length") measured along the axial direction A between the first and second ends 92, 94 when the spring 90 is unrestrained (see FIG. 7). However, in the assembled configuration, the spring 90 is compressed to the fourth distance L4. Thus, in the assembled configuration, the first end 92 of the spring 90 is biased in an axial direction A against the first end surface 72 of the boss 70, while the second end 94 of the spring 90 is biased in the opposite axial direction A against the first end surface 82 of the bushing 80. The boss 70, bushing 80, and spring 90 are collectively configured such that the ends 92, 94 of the spring 90 impart a predetermined biasing force along the axial direction A against the first ends 72, 82 of the boss 70 and the bushing 80. This predetermined biasing force, in combination with frictional forces between the spring ends 92, 94 and the first ends 72, 82 of the boss 70 and the bushing 80, predominantly defines the predetermined amount of rotational resistance between the roller body 36 and the shaft 64. The snug fit of the first portions 42 of the end caps 41 within the central bore 40, as well as the axial abutment of the end caps 41 with the boss 70 and the bushing 80, respectively, maintains the predetermined amount of rotational resistance of the roller assembly 60. A lubricant can be applied over the spring 90 and the outer surface 50 of the shaft 48 so as reduce wear on the spring 90 and the shaft 48.

As shown in FIG. 7, the shaft 64 defines a sixth distance L6 measured along the axial direction A between the opposed ends 66 of the shaft 64. The first portion 42 of each end cap 41 defines a seventh distance L7 and the second portion 43 of each end cap 41 defines an eighth distance L8, each measured along the axial direction A. The outer surface 44 of the first portion 41 of each end cap 41 defines a fifth diameter D5 and the inner surface 45 of each end cap 41 defines a sixth diameter D6. It is to be appreciated that the fifth and sixth diameters D5, D6 can be substantially equivalent to the third and fourth diameters D3, D4, respectively.

The roller body 36 can define a ninth distance L9 measured between the outer ends 66 thereof along the axial direction A. In the present embodiment, the ninth distance L9 is substantially equivalent to the sum of: the first distance L1, the second distance L2, the fourth distance L4, and twice the seventh distance L7.

In the present embodiment, which pertains to the improved knurled roller assembly 60 for the tape head 2 described above, the distances of L3, L6, L7, L8, and L9 are each predetermined by the dimensions of the stock knurled roller 33 provided with the tape head 2. Thus, L3 is about 3.318 inches (about 84.3 mm); L6 is about 3.587 inches (about 91.1 mm); L7 is about 0.690 inch (about 17.5 mm); L8 is about 0.88 inch (about 2.2 mm); and L9 is about 3.142 inches (about 79.8 mm).

In the present embodiment, there is about 1.93 inches (about 49.0 mm) of axial space between the inner ends 47b of the end caps 41. The boss 70, the bushing 80, and the spring 90 can be tailored as needed to fit within this space and provide the predetermined amount of rotational resistance between the roller body 66 and the shaft 64.

Referring now to FIG. 8, an embodiment of the improved roller assembly 60 is shown where the boss 70 is a separate piece that is coupled to a shaft. In this embodiment, the shaft can optionally be the original shaft 48 of the stock knurled roller 33. The boss 70 can be a bushing 100 having an inner diameter D8 substantially equal to or slightly greater than the outer diameter D1 of the shaft 48. The bushing 100 can be rotationally locked to the shaft 48 by any of a variety of coupling techniques, such as welding, brazing, press fitting, heat-shrink fitting, and keyed connections, by way of non-limiting examples. In the illustrated embodiment, a slot 102 is formed radially through a portion of the bushing 100 and into a portion of the shaft 48, and a weld 104 is formed in the slot so as to rotationally lock the bushing 100 the shaft 48.

An example method of assembling the roller assembly shown in FIG. 8 includes disassembling a tape head 2 and removing the knurled roller 33 therefrom. With the knurled roller 33 removed, the end caps 41, the shaft 48, and the leaf spring 54 can be removed from the roller body 36. The shaft 48 is inserted within bushing 100 and the shaft 48 and bushing 100 can be placed in an alignment frame or jig that has features (such as recesses and/or abutment surfaces, for example) for establishing and maintaining proper axial alignment of the bushing 100 and the shaft 48. While the shaft 48 and bushing 100 are loaded in the jig, the slot 102 can be formed through a portion of the bushing 100 and into the shaft 48. The weld 104 can be formed in the slot 102 and, after cooling, the weld 104 can be ground, smoothed, or otherwise polished so as not to protrude radially from an outer surface 176 of bushing 100.

Bushing 80 can be inserted within the central bore 40 of the roller body 36 so as to remain proximate one of the outer ends 37 thereof. One of the end caps 41 can be inserted into the central bore 40 so that the axial inner end 47b of the end cap 41 abuts the bushing 80 and then translates the bushing 80 to its predetermined axial position within the central bore 40. With bushing 80 and the corresponding end cap 41 is place, the coil compression spring 90 can be received over the outer surface 50 of the shaft 48, a lubricant can be applied over the spring 90 and the outer surface 50 of the shaft 48, and the shaft 48 and spring can be inserted into the central bore 40 from the opposite end 37 until the ends 92, 94 of the spring 90 abut the axially inner surfaces 172 and 82 of the bushings 100, 80, respectively. The other end cap 41 can be coupled to the roller body 36 so as to maintain the roller assembly 60 in the assembled configuration.

It is to be appreciated that in other embodiments, the seventh distance L7 (defined by first portions 42 of the end caps 41) can be in the range of about 15 mm to about 25 mm, and more specifically in the range of about 17 mm to about 18 mm. In additional embodiments, the sum of L1, L2, and L4 can be in the range of about 40 mm to about 60 mm, and more specifically in the range of about 46 mm to about 52 mm. In the embodiments shown in FIGS. 6 through 8, when the roller assembly 60 is in the assembled configuration, the sum of L1, L2, and L4 defines the axial distance between the axially inner ends 47b of the end caps 41. The sum of L1 and L2 can be in the range of about 20 mm to about 40 mm, and more particularly in the range of about 27 mm to about 33 mm. The spring 90 can possess a spring rating in the range of about 1.00 N/mm to about 3.00 N/mm, and more particularly in the range of about 2.00 N/mm to about 2.20 N/mm, and more particularly about 2.11 N/mm.

An example method of automatically applying tape 8 to a package, such as with the tape head 2, includes engaging the adhesive side 10 of a length of tape 8 with the knurled outer surface 38 of the roller body 36, then rotating the roller body 36 about the outer surface 50 of the shaft 48, which extends through the central bore 40 of the roller body 36 and is fixed to the frame 4 so as to prevent the shaft 48 from rotating with respect to the frame 4. In this example method: (1) the shaft 48 extends through the bushing 80 that is disposed within the central bore 40 and is rotationally fixed to the roller body 36; (2) the shaft 48 has the boss 70 that defines the radial surface 72 that faces the end surface 82 of the bushing 80 and is spaced from the end surface 82 of the bushing 80; and (3) the coil compression spring 90 is received over the outer surface 50 of the shaft 48 and between the radial surface 72 of the boss 70 and the end surface 82 of the bushing 80. This example method includes biasing opposite ends 92, 94 of the coil compression spring 90 against the radial surface 72 of the boss 70 and the end surface 82 of the bushing 80 so as to provide the predetermined rotational resistance between the roller body 36 and the shaft 48 while the roller body 36 rotates about the shaft 48.

EXAMPLES

Example 1

The improved knurled roller assembly 60 was constructed with a resistance mechanism 62 having the following features: the boss 70 was formed by welding bushing 100 to the original shaft 42 of the stock knurled roller 33, which bushing 100 was Part No. 64994981, manufactured by MSC Industrial Direct Co., Inc. (referred to hereinafter as "MSC"), which bushing 100 defined a first distance L1 of about 0.475 inch (about 12.0 mm) and was ground to define a second diameter D2 of about 0.550 inch (about 14.0 mm); the bushing 80, which was MSC Part No. 64994999, defined a second distance L2 of about 0.685 inch (about 17.4 mm) (after grinding the stock beveled end of the bushing 80), a third diameter D3 of about 0.591 inch (about 15 mm), and a fourth diameter D4 of about 0.433 inch (about 11.0 mm); the boss 70 and bushing 80 were axially spaced from each other so that the fourth distance L4 was about 0.606 inch (15.4 mm); the spring 90 employed in this example was MSC Part No. 03308491, which is a stainless steel coil compression spring having an outside diameter of about 0.480 inch (about 12.20 mm), a wire diameter of about 0.041 inch (about 1.04 mm), a free length L5 of about 0.75 inch (about 19.05 mm), and a spring rating of about 12 lbs/inch (about 2.10 N/mm). A lubricant (80W90 gear oil) was applied over the spring 90 and the outer surface of the shaft 64 prior to insertion within the central bore 40. In the assembled configuration, the spring 90 was compressed by about 3.65 mm (about 0.144 inch), resulting in an axial biasing force of about 7.67 N (about 1.72 lbs). It is to be appreciated that the MSC parts described above can be substituted with other like parts. Sizing the components to result in a spring compression of about 3.81 mm (about 0.150 inch), resulting in an axial biasing force of about 8.00 N (about 1.80 lbs) was also found to be successful.

The original knurled roller assembly 33 of the tape head 2 was replaced with the roller assembly 60 set forth in this example, and the refurbished tape head 2 was run successfully for about 1.5 Million cycles without requiring replacement of the resistance mechanism 62, although at about 400,000 cycles the tape head 2 was cleaned to remove build-up of adhesive (from the tape 8) that had collected between the end caps 41 and the first pair of arms 20 of the frame 4. Thus, in this example the improved knurled roller assembly 60 was shown to have a service life greater than the stock knurled roller 33 by a factor of about 100. It is to be appreciated that the cost savings of increasing the service life of the taping head 2 by a factor of about 100 provides incredible cost savings, particularly for a fulfilment center that employs such tape heads 2 in about 12 to 15 automated taping assemblies that run up to 400 cycles per hour for about 20 hours per day.

Example 2

The leaf spring 54 was removed from a stock knurled roller assembly 33 provided with a lower tape head 2 of an automated taping assembly. In place of the leaf spring 54, a plurality of pins, each having a diameter of about 3/16 inch (about 4.76 mm), were placed in the annulus between the outer surface 50 of the shaft 48 and the inner surface of the 39 of the roller body 36 and packed with silicone grease. The lower tape head 2 was re-inserted within the automated taping assembly and was run successfully for about 150,000 cycles before failing.

It is to be appreciated that the embodiments of the improved roller 60 assembly disclosed herein can be employed with other tape head types and sizes. For example, the improved roller 60 assembly disclosed herein can be scaled or otherwise configured to be employed on an AccuGlide™ 2+ Standard Taping Device (STD) 2 Inch Upper or Lower Taping Head or on various types of high-speed taping devices, such as the AccuGlide™ 3 High-Speed Taping Device (3 Inch). It is further to be appreciated that the embodiments of the improved roller assembly 60 disclosed herein can be employed not only with other types and models of taping devices, but with virtually any type of device that utilizes rollers requiring a predetermined amount of rotational resistance between a roller and central shaft supporting the roller. Furthermore, the embodiments disclosed herein can be scaled upwards or downwards in size for employment with larger- or smaller-scale devices, assemblies, or systems employing rollers.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above in connection with the respective above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A taping device for an automated taping assembly adapted for applying tape to a package, the tape having an adhesive side and an opposed non-adhesive side, the taping device comprising:
   a mount configured to carry a roll of the tape;
   a plurality of rollers configured to engage the tape so as to convey the tape from the mount to a dispensing region of the taping device, wherein at least one roller of the plurality of rollers comprises:
      a roller body rotatable about a central axis, the roller body including an outer roller surface, and an inner roller surface that defines a central bore that extends along the central axis;
      end caps positioned at opposite ends of the roller body, wherein each of the end caps defines a first portion that extends within the central bore and a second portion that defines a flange that abuts a respective one of the ends of the roller body when the at least one roller is in an assembled configuration;
      a shaft that is configured to extend through the central bore of the roller body and the first portions of the first and second end caps, the shaft defining an outer shaft surface, the shaft having a boss that extends radially outward from the outer shaft surface,
      a bushing configured to be rotationally coupled to the roller body within the central bore and received over the outer shaft surface, wherein opposed axially inward surfaces of the bushing and the boss are spaced from each other in an axial direction extending along the central axis when the at least one roller is in the assembled configuration;
      a coil spring configured to be received within the central bore, over the outer shaft surface, and between the opposed axially inward surfaces of the boss and the bushing,
      wherein the shaft, the boss, the bushing, and the coil spring are collectively configured such that opposite ends of the coil spring contact the opposed axially inward surfaces of the boss and the bushing in a manner causing an amount of resistance between the roller body and the shaft when the roller body rotates with respect to the shaft during use of the taping device to apply tape to a package.

2. The taping device of claim 1, wherein the bushing and the boss each define an axially outward surface that abuts the first portion of an associated one of the first and second end caps when the at least one roller is in the assembled configuration.

3. The taping device of claim 1, wherein the boss comprises another bushing, and the another bushing is welded to the shaft.

4. A roller assembly for a taping device, the roller assembly comprising:
   a roller body defining a central bore;
   a bushing configured to be received within the central bore and rotationally fixed to the roller body;
   a shaft configured to be disposed within the central bore, the shaft defining an outer surface that extends through the bushing;
   a boss extending radially outward from the outer surface of the shaft, wherein the boss is rotationally locked to the shaft; and
   a resistance element configured to be disposed within the central bore and to contact the bushing and the boss in a manner providing an amount of rotational resistance between the roller body and the shaft when the roller assembly is in an assembled configuration.

5. The roller assembly of claim 4, wherein bushing and the boss each define axially inward surfaces that face one another, and the resistance element is a coil compression spring configured to be received over the outer surface of the shaft between the axially inward surfaces.

6. The roller assembly of claim 5, wherein the axially inward surfaces are spaced from each other by a distance in the range from about 10 mm to about 30 mm along an axial direction.

7. The roller assembly of claim 6, wherein the distance is in the range of about 16 mm to about 22 mm.

8. The roller assembly of claim 4, further comprising a lubricant configured to be disposed between the resistance element and at least a portion of the shaft.

9. The roller assembly of claim 4, wherein the outer surface of the shaft has a diameter of about 10 mm.

10. The roller assembly of claim 9, wherein the bushing has an outer diameter of about 15 mm so as to provide a compression fitting between the bushing and the roller body.

11. The roller assembly of claim 9, wherein the boss has an outer diameter of about 14 mm so as to allow the boss to rotate freely within the central bore.

12. The roller assembly of claim 4, further comprising a pair of end caps connectable to opposite ends of the roller body, wherein each end cap defines a first portion configured for insertion within the central bore a second portion that defines a flange configured to abut a respective one of the ends of the roller body when the roller assembly is in the assembled configuration.

13. The roller assembly of claim 12, wherein the first portion of each of the pair of end caps has an axial length in the range of about 17 mm to about 18 mm.

14. The roller assembly of claim 13, wherein the first portion of each of the pair of end caps defines an innermost end, and the innermost ends of the pair of end caps are spaced from each other by a distance in the range of about 46 mm to about 52 mm when the flanges abut the ends of the roller body.

15. The roller assembly of claim 14, wherein:
   the bushing and the boss each have 1) a first end, 2) a second end spaced from the first end so as to define an axial dimension in an axial direction, and 3) an outer surface extending between the first and second ends in the axial direction; and when the roller assembly is in the assembled configuration, the first end of the bushing abuts the innermost end of one of the end caps;

the first end of the boss abuts the innermost end of the other of the end caps;

the sum of the axial dimensions of the boss and bushing is about 27 to about 33 mm; and the resistance element is a coil compression spring having opposite spring ends that abut the second end of each of the bushing and the boss.

16. The roller assembly of claim 15, wherein the coil compression spring has a spring rating in the range of about 2.00 to about 2.20 N/mm.

17. The roller assembly of claim 16, wherein the sum of the axial dimensions of the boss and the bushing is about 30 mm, and the spring rating is about 2.11 N/mm.

18. The roller assembly of claim 4, wherein boss is welded to the shaft.

19. The roller assembly of claim 4, wherein the boss and the shaft are monolithic.

20. A method automatically applying tape to a package, the method comprising:

engaging an adhesive side of a length of tape with a knurled outer surface of a roller body;

rotating the roller body, responsive to the engaging step, about an outer surface of a shaft that extends through a central bore of the roller body and is fixed to a frame so as to prevent the shaft from rotating with respect to the frame, wherein the shaft extends through a bushing that is disposed within the central bore and is rotationally fixed to the roller body, wherein the shaft has a boss that defines a radial surface that faces an end surface of the bushing and is spaced from the end surface of the bushing, wherein a coil compression spring is received over the outer surface of the shaft and between the radial surface of the boss and the end surface of the bushing; and biasing opposite ends of the coil compression spring against the radial surface of the boss and the end surface of the bushing so as to provide a rotational resistance between the roller body and the shaft during the rotating step.

* * * * *